(12) United States Patent
Chandhok et al.

(10) Patent No.: US 7,472,194 B2
(45) Date of Patent: Dec. 30, 2008

(54) DATA CHANNEL RESOURCE OPTIMIZATION FOR DEVICES IN A NETWORK

(75) Inventors: Ravinder Chandhok, Poway, CA (US); Stephen A. Sprigg, Poway, CA (US); Brian Minear, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 732 days.

(21) Appl. No.: 10/187,220

(22) Filed: Jun. 28, 2002

(65) Prior Publication Data

US 2004/0001459 A1 Jan. 1, 2004

(51) Int. Cl.
G06F 15/16 (2006.01)
G06F 1/12 (2006.01)

(52) U.S. Cl. .................... 709/227; 709/228; 709/239
(58) Field of Classification Search ............. 709/227, 709/228, 239
See application file for complete search history.

(56) References Cited

U.S. PATENT DOCUMENTS

| | | | |
|---|---|---|---|
| 5,396,648 A | 3/1995 | Patsiokas et al. | |
| 5,465,397 A | 11/1995 | Pickert | |
| 5,537,404 A | 7/1996 | Bentley et al. | |
| 5,570,413 A | 10/1996 | Ahlberg et al. | |
| 5,790,955 A | 8/1998 | Tomoike | |
| 5,845,212 A | 12/1998 | Tanaka | |
| 6,011,784 A | 1/2000 | Brown et al. | |
| 6,023,609 A | 2/2000 | Futamura | |
| 6,185,184 B1 | 2/2001 | Mattaway et al. | |
| 6,212,175 B1 | 4/2001 | Harsch | 370/338 |
| 6,272,117 B1 | 8/2001 | Choi et al. | |
| 6,338,089 B1 * | 1/2002 | Quinlan | 709/227 |
| 6,542,747 B1 | 4/2003 | Syukri | |
| 6,567,672 B1 | 5/2003 | Park et al. | |
| 6,606,645 B1 * | 8/2003 | Cohen et al. | 709/203 |
| 6,862,452 B2 | 3/2005 | Sprigg | |
| 6,898,794 B2 * | 5/2005 | Babutzka et al. | 719/330 |
| 6,980,534 B1 | 12/2005 | Nee et al. | |

(Continued)

FOREIGN PATENT DOCUMENTS

RU 2108679 4/1998

(Continued)

OTHER PUBLICATIONS

USENIX, Efficient Support of P-HTTP in Cluster-based Web Servers, Aron, M., ET. AL. Jun. 1999, p. 1-15.*

(Continued)

*Primary Examiner*—Zarni Maung
(74) *Attorney, Agent, or Firm*—James T. Hagler; Robert J. O'Connell; Thomas Rouse

(57) ABSTRACT

A system, method, and program for optimizing the data channel availability on a computer device through selectively delaying the closing of an open channel on a computer network having expensive bandwidth, such as a cellular telecommunication network. The device has a plurality of device resources that utilize an open channel to communicate across the network, and optimally delays the closing of an open communication channel after cessation of usage thereof by a device resource such that other device resources can utilize the open communication channel prior to closure while still minimizing the duration of the expensive open channel.

24 Claims, 2 Drawing Sheets

U.S. PATENT DOCUMENTS

| | | |
|---|---|---|
| 7,162,224 B2 | 1/2007 | Sprigg |
| 7,218,621 B2 | 5/2007 | Lee |
| 2002/0009069 A1 | 1/2002 | Kobayashi |
| 2002/0062372 A1* | 5/2002 | Hong et al. ............... 709/225 |
| 2002/0082033 A1 | 6/2002 | Anit et al. |
| 2002/0196769 A1 | 12/2002 | Ohmi et al. |
| 2003/0028580 A1* | 2/2003 | Kucherawy ............... 709/101 |

FOREIGN PATENT DOCUMENTS

| | | |
|---|---|---|
| WO | 0001173 | 1/2000 |
| WO | 03047212 | 6/2003 |

OTHER PUBLICATIONS

Improving End-to-End Performance of the Web usig Server Volumes and Proxy FILTERS, Cohen, e., et. al., ACM 1-58113-003-1/98, p. 241-253.*

An efficient and lightweight embedded Web Server for Web-based network element management, Hong-Taek Ju, Intl Journal of Network Management, 2000, p. 261-275.*

Hansen, J.S. "Dynamic Adaptation of Network Connections in Mobile Environments", Computer.org, Jan.-Feb. 1998, pp. 39-47, relevant passages: pp. 39-43 and 46-47.

International Search Report, PCT/US2003/020388, International Search Authority US, Oct. 3, 2003.

* cited by examiner

DATA CHANNEL RESOURCE OPTIMIZATION FOR DEVICES IN A NETWORK

BACKGROUND OF THE INVENTION

I. Field of the Invention

The present invention generally relates to computer networks and computer communications across computer networks. More particularly, the invention relates to the optimal utilization of open data channels between computer devices on the network, preferably a wireless network, by device resources to communicate across the network.

II. Description of the Related Art

Computer devices that communicate data, typically in the form of packets, across a computer network open a "data" or "communication" channel on the network such that the device can send and receive data packets. The computer devices often have computer resources, such as programs and hardware components, which individually use open communication connections to transmit and receive data on the network. In extant network computers, typically personal computers connected through an Ethernet or other LAN, the device resources are polled when an open communication channel is present to see if the resource needs to send or receive data at that time. If the device resources do not need the open channel, then the device closes the channel and simply reopens the channel if a device resource requires communication because the communication channel on the LAN is inexpensive to establish and utilize.

However, a problem arises when the network communication channel is expensive to establish, such as in a wireless network between wireless devices, and especially with cellular telecommunication devices where every second of connectivity has an appreciable cost to the user. Conversely to a wire-based LAN, if a cellular telecommunication device resource needs to communicate across the network, it is not simple to establish a communication channel on the cellular network because such connection will effect a per second airtime charge. The cellular telecommunication device must therefore either open an expensive communication channel if the device resource communication requirement is sufficiently vital to offset the cost of doing so, or the device resource must simply wait until another communication channel is opened intentionally and then communicate across the open connection prior to its closure.

Accordingly, it would be advantageous to provide a system and method that can provide device resources the most efficient access to an otherwise expensive communication channel. The system and method should not cause interruption of other device functionality and other device resources that have priority in utilizing the communication channel. Further, the provision of the open communication channel should not overly utilize the expensive bandwidth of the network. It is thus to the provision of such a system and method to optimize device resource data channel usage that the present invention is primarily directed.

SUMMARY OF THE INVENTION

The present invention is a system, method, and computer program for communication between computer devices on a computer network where the establishment of a communication channel is expensive, such as in a wireless network. In the system, each computer device selectively opens and closes a communication channel onto the computer network and has a plurality of device resources that selectively utilize open communication channels to communicate with other devices or servers across the network. The computer device selectively opens a communication channel when required by a device resource or as otherwise commanded by the user, and the device optimally delays the closing of the communication channel after cessation of usage thereof by a device resource, such as a voice or data call, and selectively allows other device resources to utilize the open channel prior to the intentional closure thereof. This optimal "lingering" of the open channel mitigates device resources requiring data communication and either causing an expensive communication channel to be opened or waiting and affecting computer device functionality. Further, the duration of the open channel can be optimally minimized so as not to overly utilize the expensive bandwidth while still providing connectivity to other device resources.

The method for communication can be implemented by a computer program being executed on a computer device and which effects the steps of selectively opening a communication channel from the device to the network when required by a device resource, and after cessation of usage of the communication channel by a device resource, optimally delaying the closing of the communication channel, and then selectively allowing other device resources to utilize the open communication channel while closure thereof is delayed.

The present invention thus provides a system and method that allows the resources of a computer device to access an otherwise expensive communication channel, wherein the communication channel is expensive to initially establish and maintain. The present invention can implement a priority of device resource communication access and thus not interrupt important device functionality in implementation. Additionally, the optimization of the delayed closure of the open channel can be tailored to the specific resources on the computer device such that the duration of the open channel does not overly utilize the expensive bandwidth of the network. The present invention accordingly provides an advantage in that a computer device, such as a cellular telecommunication device, can minimize the number of communication channel establishments necessary to provide adequate network access to the resident device resources.

Other objects, advantages, and features of the present invention will become apparent after review of the hereinafter set forth Brief Description of the Drawings, Detailed Description of the Invention, and the claims.

DETAILED DESCRIPTION OF THE INVENTION

Figure 1:
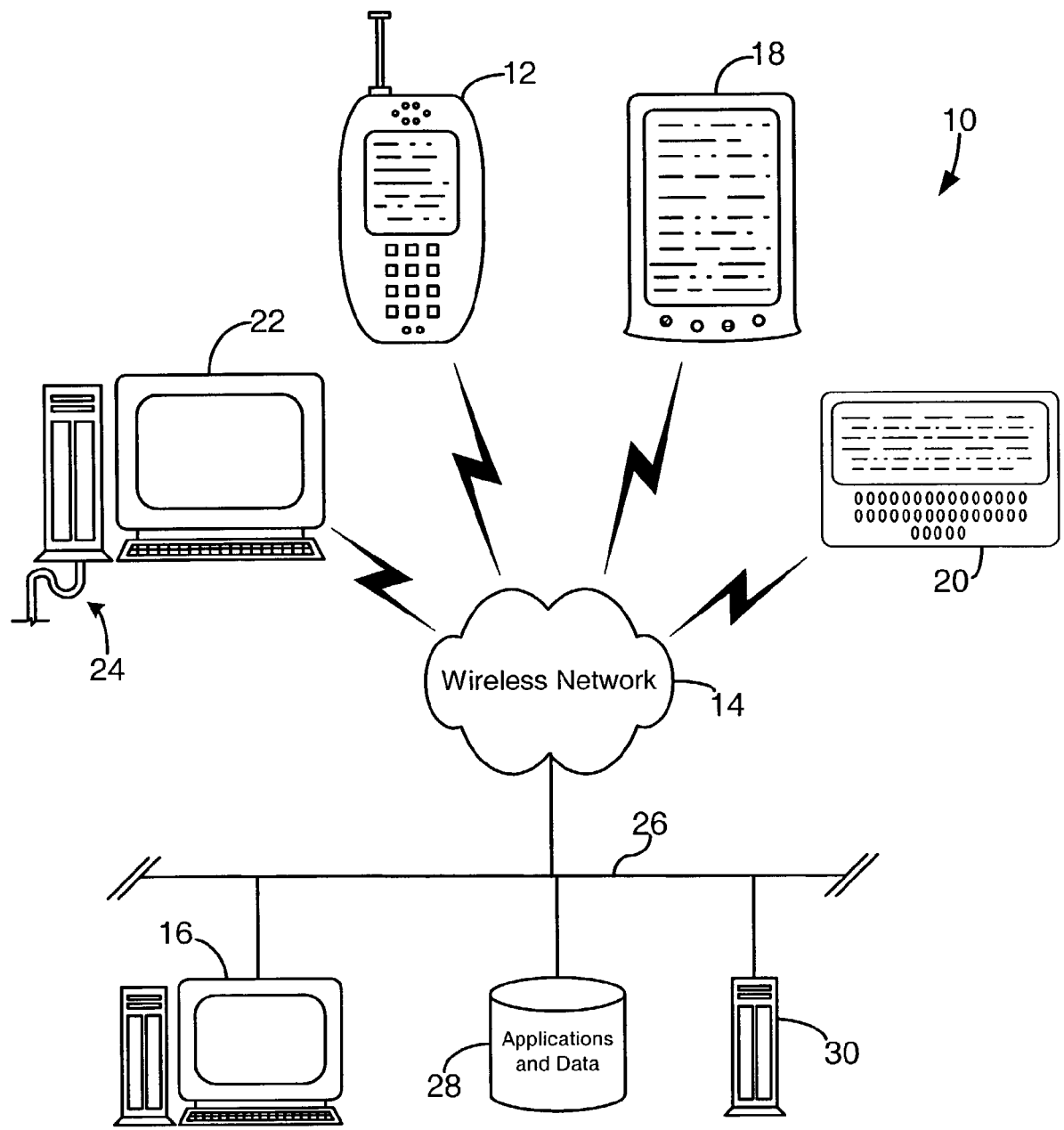
FIG. 1 is a representative diagram of a computer network embodied as partially wireless with the computer hardware and wireless devices that communicate with each other across the network shown.

With reference to the figures in which like numerals represent like elements throughout, FIG. 1 illustrates a network 10 for having a plurality of computer devices interconnected thereon. Such computer devices can include wireless devices, such as cellular telephone 12, in communication across a wireless network 14 and a LAN-based network 26, with at least one network server, such as application download server 16 or stand alone server 30, that selectively downloads or provides access to software applications or other data to the wireless devices across a wireless communication portal or other data access to the wireless network 14. There can be other computer devices resident on the LAN 26, such as a separate applications database 28, or other devices that can be in data communication with the LAN 26.

As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The system and method can thus be performed on any form of computer device computer module including a wired or wireless communication portal, including without limitation, wireless modems, PCMCIA cards, access terminals, personal computers, access terminals, telephones without a display or keypad, or any combination or sub-combination thereof.

The system and method are utilized in a network where communication channels have significant overhead in their initial creation. In wireless networks, or partially wireless networks, such as that shown in FIG. 1, the communication channel must be initially bridged between at least the computer device itself, such as devices 12,18,20,22, and the network, and the maintenance of the communication channel tends to be costly, especially in a cellular telecommunication network. The use of cellular telecommunication pathways has been increasing because wireless devices, such as cellular telephones, are being manufactured with increased computing capabilities and are becoming tantamount to personal computers and handheld personal digital assistants ("PDAs"), communicating packets including voice and data over the wireless network. These "smart" cellular telephones have installed application programming interfaces ("APIs") onto their local computer platform that allow software developers to create software applications that operate on the cellular telephone, and control certain functionality on the device.

In many of the smart cellular devices, such as cellular telephone 12 or PDA 18, after the last point-to-point (PPP) connection has stopped being used by the device resource, the device waits for a certain "linger" time, having a default duration of linger before fully terminating the connection. Thus, the optimal delay can be implemented through optimization of an extant linger timer on a computer device, or a computer device can be modified to have an optimal duration of linger of the open communication channel as is further described herein. The linger timer, if present, can typically be altered through a software command to platform of the computer device, such as devices 12,18,20,22.

Figure 2:
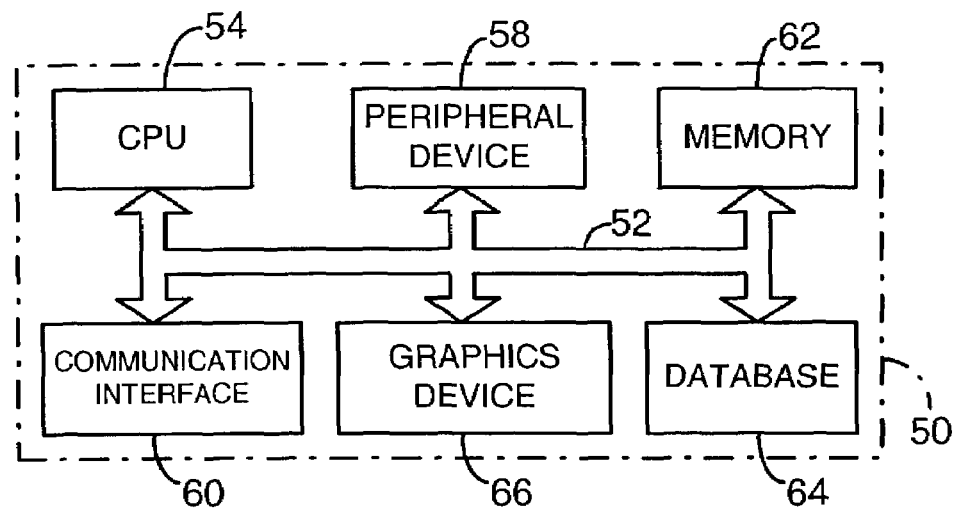
FIG. 2 is a block diagram of the computer platform of a wireless computer device with several of the device resources connected to a communication interface via a bus.

As shown more particularly in FIG. 2, each device, such as cellular telephone 12, has a computer platform 50 that can receive data, execute software applications, and display data transmitted from other computer devices, such as PDA 18 and application download server 16. The computer platform 50 includes a bus 52 that interconnects its components. Among other components resident on the device platform 50 are several device resources: a central processing unit 54 (CPU), one or more peripheral devices 58, a communication interface 60, a memory 62, and alternately a secondary database 64 and graphics device 66. The CPU 54 computer platform 50 can be an application-specific integrated circuit ("ASIC"), or other processor, microprocessor, logic circuit, or other data processing device. The CPU 54 is installed at the time of manufacture of the wireless device and is not normally upgradeable. The CPU 54 or other processor executes the application programming interface ("API") layer that interfaces with any resident programs in the memory 62 of the computer device. The memory can be comprised of read-only or random-access memory (RAM and ROM), EPROM, EEPROM, flash cards, or any memory common to computer platforms. The computer platform 50 can also include a local secondary database 64 that holds the software applications not actively used in memory 62, such as the software applications downloaded from the application download server 16. The local database 64 is typically comprised of one or more flash memory cells, but can be any secondary or tertiary storage device as known in the art, such as magnetic media, EPROM, EEPROM, optical media, tape, or soft or hard disk.

The system thus optimizes communication between computer devices, such as devices 12,16,18,20,22,28,30 on a computer network (wireless network 14 and/or LAN 26), wherein each device selectively opens and closes a communication channel onto the computer network 14 and/or 26 through the communication interface 60, and the plurality of device resources, such as resources 54,58,60,62,64,66, each can selectively utilize the communication channel to communicate with other devices, such as devices 12,16,18,20,22,28, 30, across the network(s). The device platform 50 will selectively open a communication channel when required by a device resource, such as a voice call to a cellular telephone 12, a text stream from pager 20, or a need for data from a process executing on the CPU 54 that needs to send data to or receive data from a server 30 on the network. For example, the communication channel can be a secure socket between the one or more devices 12,18,20,22 and a server 16.

To minimize the need for each device resource to repeatedly open a communication channel at the moment when needed, each device 12,16,18,20,22,28,30 optimally delays the closing of an open communication channel after cessation of usage thereof by a device resource and selectively allows other device resources 54,58,60,62,64,66 to utilize the open channel prior to closure of the channel. With the optimal delay, the other device resources that need to communicate across the channel can wait until the open and unused channel lingers and then send or receive data through any priority system as known in the art such as round-robin polling, a priority queue, daisy-chain, or bus arbitration.

The delay is preferably a predetermined duration that is optimized based upon statistical usage of device resources 54,58,60,62,64,66 in sequence, or likelihood of the requirement of a further communication channel. Alternately, the predetermined duration can be modeling based upon other communication intervals of importance, such as a billing interval for the maintenance of a communication channel. For example, if the billing interval is each minute, i.e. 60 seconds, the linger time can be 59 seconds. Moreover, several methods can be combined to calculate the optimal duration of delay, such as having the duration roll to 119 seconds if the statistical usage of the communication determines that the usage of further device resources of the open channel will span on average greater than 59 seconds of usage of a lingering channel after a certain device resource ceases use of the channel. The predetermined duration of the optimal delay of the closing of a communication channel is reset upon another device resource 54,58,60,62,64,66 utilizing the open channel prior to closure thereof. This optimal duration of linger thus further optimally minimizes the overall use of bandwidth and cost to the user that occurs from having too long of a linger duration for the device.

Further, the system can accelerate the closing of open connections that otherwise linger for a default duration on the network based upon the statistical modeling, which preserves system bandwidth. For example, if it is known that specific applications only use an open data channel has been active beyond a certain duration, then the system can alter the duration of the open channel based solely upon the duration of application execution and close the channel earlier than elapse of the default duration. The system could also account for several applications with different probabilities to utilize an open data channel and optimize the closure rate based upon a decreased likelihood of usage.

The device resource usage data for optimization of the predetermined duration can be stored either on the device 12,18,20,22, in the memory 62 or secondary database 64. Alternately, or in conjunction therewith, the device resource usage data can be sent to a server 16 or database 28 across the network 14 and/or 26 to be stored. The actual determination of the optimal duration of the delay can thus be performed at the computer device upon CPU 54, or alternately can be performed on another device on the network, such as server 16, and the optimal duration can be sent to the one or more devices 12,18,20,22. As would be known to one of skill in the art, the device storage usage data can be transmitted from one computer device to another for the determination process, and does not have to be resident to device making such calculation.

Figure 3:
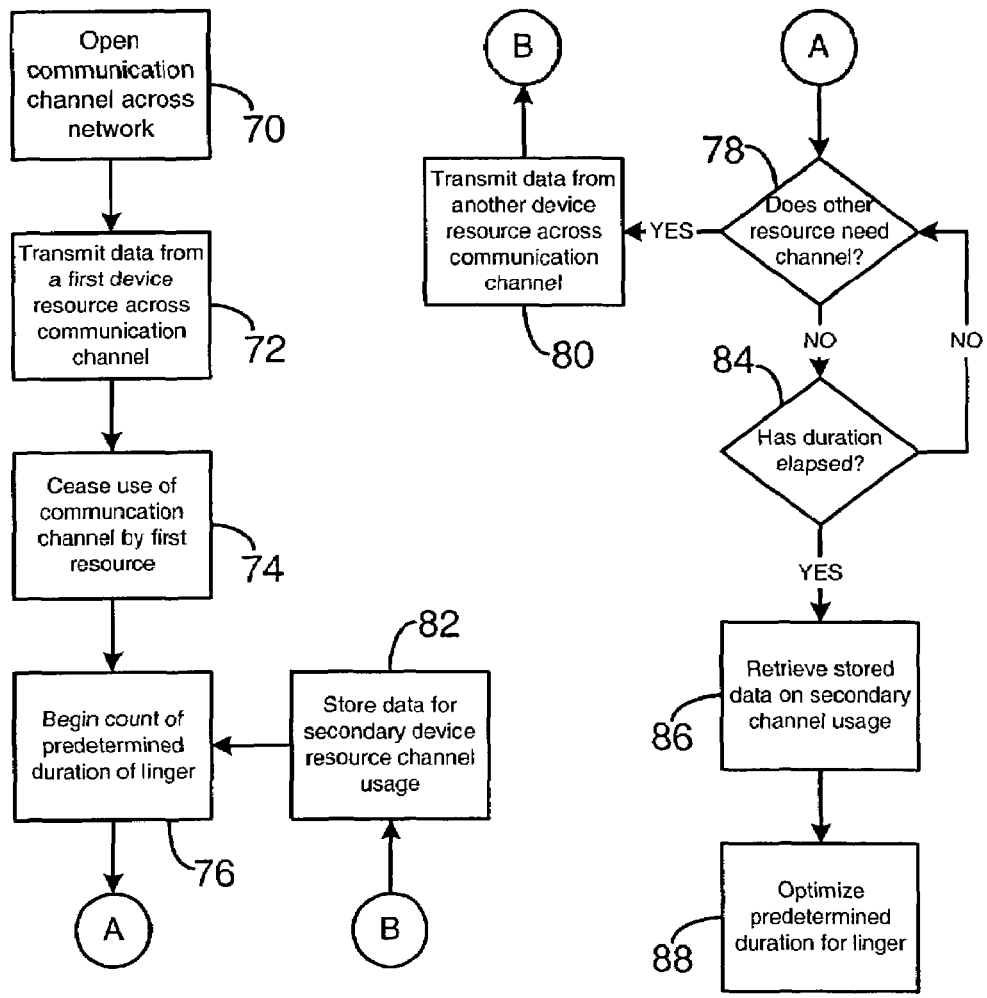
FIG. 3 is a flowchart of the process executed on the computer device to optimize the duration of delay ("linger") before an open communication channel is closed.

The process executed on the computer device, such as wireless devices 12,18,20,22 is shown in the flowchart of FIG. 3. The communication channel is opened from a device, as shown at step 70, and then data is transmitted from a first device resource 54,58,60,62,64,66 across the open communication channel, as shown by step 72. The communication channel can be opened (step 70) by either a direct user request, incoming call, or by necessity of a device resource. Once the data from the first device resource has been transmitted (or received) by the first device resource, the device resource ceases use of the communication channel as shown at step 74, and then the count for the predetermined duration of the open channel ("linger") occurs as show at step 76, during which the communication channel will remain available for usage by other device resources 54,58,60,62,64,66. Such "count" can be a count-up or down, or other method known in the art to determine the elapse of a duration of time.

Once the count for the predetermined duration has begun at step 76, a decision is made as to whether another device resource needs to communicate across the open channel, as shown at decision 78. If another device does need to use the open channel, then the data from the second device resource is transmitted across the open communication channel as shown at step 80. Either while the secondary device resource is transmitting data across the open channel or during such transmission, the device resource usage data is preferably stored on the device as shown at step 82, and then the predetermined delay is preferably reset to once again count, as shown at step 76. The same predetermined duration can be used at this reset, or alternately, a new predetermined duration can be used based upon the secondary device resource transmitting or the stored usage data. Furthermore, at step 82, the device, such as device 12,18,20,22, can also or exclusively transmit the device resource usage data to another device on the network.

If another device resource does not require the open communication channel to send or receive data at decision 78, then another determination is made as to whether the predetermined duration of delay has elapsed, as shown at decision 84. If the predetermined duration has not elapsed at decision 84, then the process returns to decision 78 and again determines if another device resource needs the open channel, and then iterates to decision 84, thus entering a wait state while the predetermined duration elapses. Once the predetermined duration of delay has elapsed at decision 84, the device preferably retrieves the stored data on secondary channel usage at shown at step 86, and then optimizes the predetermined duration for delay (linger) as shown at step 88. The process then terminates and renews upon an open communication channel occurring on the device 12,18,20,22. Step 88 can also set the optimal duration of linger to close an open channel before a certain default linger duration occurs if application usage indicates that usage of the open channel does not justify maintenance of the expensive open channel for the full linger duration. Through such action, the overall bandwidth of the system can be conserved as open channels of an unnecessary duration can be minimized.

Steps 86 and 88 to optimize the predetermined duration are preferably performed at the device, but can alternately be carried out upon another device 12,16,18,20,22,28,30 on the network 14 and/or 26. The remote device carrying out the optimization should have access to the device resource usage data, or store it locally, but the device can also optimize based upon a larger model or other criteria where the device resource usage data for that specific device is unnecessary.

The method for communication between one or more computer devices 12,16,18,20,22,28,30 that each selectively opens and closes a communication channel on a computer network 14 and/or 26, wherein each device includes a plurality of device resources 54,58,60,62,64,66 that selectively utilize communication channels to communicate with other devices across the network. The method includes the steps of selectively opening a communication channel from the device, such as devices 12,18,20,22, to the network 14 and/or 26 when required by a device resource 54,58,60,62,64,66. And after cessation of usage of the communication channel by a device resource, the method includes the steps of optimally delaying the closing of the communication channel (linger), and selectively allowing other device resources 54,58,60,62,64,66 to utilize the open communication channel prior to closure thereof.

The step of optimally delaying the closing of the communication channel is optimally delaying of the closing of the communication channel after the elapse of a predetermined duration, as described above. Then method can also include the step of closing the communication channel after elapse of the predetermined optimal duration.

As embodied in FIG. 3, the method can include the step of resetting the predetermined duration of the optimal delay of the closing of a communication channel upon another device resource 54,58,60,62,64,66 utilizing the open channel prior to closure of the channel. Further, if there are one or more servers, such as servers 16 and 30 in FIG. 1, on the computer network 26, the step of selectively opening a communication channel from the device to the network is selectively communicating between the device and the one or more servers, such as from device 12,18,20,22 to servers 16 and 30.

In the embodiment of FIG. 1, wherein the computer network includes a wireless network 14 (specifically a cellular telecommunication network), the step of selectively opening a communication channel from the device to the network is selectively opening a communication channel from a wireless device 12,18,20,22 to the wireless network 14 when required by a device resource. Furthermore, with the wireless devices 12,18,20,22, the step of selectively opening a communication channel from the devices 12,18,20,22 to the network 14 can be opening a secure socket between the one or more wireless devices and the servers 16 and 30. More particularly with the embodiment of FIG. 1, the step of selectively opening a communication channel is preferably selectively opening a cellular communication channel from a cellular device to the cellular telecommunication network when required by a device resource 54,58,60,62,64,66 or user command.

The step of optimally delaying the closing of the communication channel is preferably optimally delaying the closing of the communication channel based upon device resource usage data, such as that stored at step 82 in FIG. 3. Thus, the method can further include the step of storing the device resource usage data on the device, as shown at step 82, or alternately, can store the device resource usage data on another device 12,16,18,20,22,28,30 in the network 14 and/or 26. Accordingly, the step of optimally delaying the closing of the communication channel can be optimally delaying the closing of the communication channel based upon device resource usage data stored on the one or more servers 16,30.

The method preferably include the step of determining the optimal delay for the closing of a communication channel after cessation of usage thereof by a device resource 54,58, 60,62,64,66, such as shown at step 88. Such step of determining the optimal delay for the closing of a communication channel can occur at the device 12,18,20,22, or at the one or more servers 16,30.

The system includes a computer device, such as devices 12,18,20,22, that selectively opens and closes a communication channel onto a computer network, and preferably at least a partially wireless network 14. The device is more preferably a cellular telecommunication device that can take full advantage of the optimal data channel usage. Such device preferably includes a plurality of device resources 54,58,60,62,64, 66 that selectively utilize the communication channel to communicate with other devices across the network 14. The device selectively opens a communication channel when required by a device resource 54,58,60,62,64,66 or at the direction of the user, and optimally delays the closing of a communication channel after cessation of usage thereof by a device resource and selectively allows other device resources to utilize the open channel prior to closure of the channel. The device 12,18,20,22 preferably optimally delays closing of a communication channel for a predetermined duration, and resets the duration upon another device resource 54,58,60,62, 64,66 utilizing the open channel prior to closure of the channel. Furthermore, the device 12,18,20,22 can selectively communicate with one or more servers 16 and 10 across the network 14 and/or 26.

The device 12,18,20,22 can determine locally the optimal predetermined duration based upon locally stored device resource usage data. Alternately, the device 12,18,20,22 can receive an external command to set the optimal delay of the closing of a communication channel after cessation of usage thereof by a device resource, and such external command can come from another device, such as a server 16,30, or be input from the user of the device itself.

In view of the method being executable on the computer platform of a wireless device 12,18,20,22, the steps of the method can be implemented with a program resident in a computer readable medium, where the program directs a computer device 12,18,20,22 having a device platform 50 to perform the steps of the method. Such program can be executed on any single computer platform, or can be multi-threaded among several computer platforms, such as when device resource usage data is stored and optimized among several computer devices, such as devices 12,16,18,20,22,28, 30.

The computer readable medium can be the memory 58 of the computer platform 50 of the cellular telephone 12, or other wireless device 18,20,22, or can be in a local database, such as local database 64 of the device platform 50. Further, the computer readable medium can be in a secondary storage media that is loadable onto a wireless device computer platform, such as a magnetic disk or tape, optical disk, hard disk, flash memory, or other storage media as is known in the art.

In the context of FIG. 3, the method may be implemented, for example, by operating portion(s) of the network 14 and/or 26 to execute a sequence of machine-readable instructions, such as device platform 50, the application download server 16, and separate server 30. The instructions can reside in various types of signal-bearing or data storage primary, secondary, or tertiary media. The media may comprise, for example, RAM (not shown) accessible by, or residing within, the components of the wireless network 14 or LAN 26. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

The invention claimed is:

1. A system for communication between computer devices on a computer network, comprising:
   one or more computer devices each operable to selectively open and close a communication channel to the computer network each device including a plurality of device resources operable to selectively utilize the communication channel to communicate with one or more other devices across the network;
   wherein upon a device selectively opening a communication channel to the network on behalf of a first one of said device resources for the first one of said device resources to communicate with one or more other devices, only the device delaying a closing of the communication channel once a usage of the communication channel by the first one of said device resources has ceased, and selectively allowing another one of said device resources to utilize the communication channel once the delaying the closing of the communication channel has commenced and prior to closure of the communication channel; and
   wherein the delaying comprises maintaining the communication channel in an open state until a predetermined duration expires after the usage of the communication channel has ceased, said delaying being maintained while any device resource is utilizing said communication channel and said predetermined duration being restarted upon a next cessation of usage of said communication channel, wherein said predetermined duration is set based upon a usage data collected on said plurality of device resources.

2. The system of claim 1, wherein the predetermined duration is a function of the device resource which last utilized said communication channel.

3. The system of claim 1, wherein said communication channel is closed upon expiration of said predetermined duration.

4. The system of claim 1, wherein the computer network is a wireless network.

5. The system of claim 4, wherein the wireless network is a cellular telecommunication network.

6. The system of claim 1, wherein said usage data is stored on the device.

7. The system of claim 1, wherein said predetermined duration is determined at the device.

8. The system of claim 1, wherein said predetermined duration is determined at a different one of said plurality of devices.

9. A system for communication between devices on a computer network, comprising:
one or more devices each having a communication means for selectively opening and closing a communication channel onto the computer network, each device further comprising:
a plurality of device resources that selectively utilize the communication channel to communicate with one or more other devices across the network;
a delay means for delaying a closing of a communication channel opened on behalf of a first one of said device resources for the first one of said device resources to communicate with the one or more other devices once a usage of the communication channel by the first one of said device resources has ceased; and
a means for selectively allowing another one of said device resources to utilize said communication channel for communication across the network once the delaying the closing of the communication channel has commenced and prior to closure of said channel;
wherein only said device performs said delaying the closing of the communication channel; and
wherein said delaying comprises maintaining the communication channel in an open state until a predetermined duration expires after the usage of the communication channel has ceased, said delaying is maintained while any device resource is utilizing said communication channel, and said predetermined duration is restarted upon a next cessation of usage of said communication channel, wherein said predetermined duration is set based upon a usage data collected on said plurality of device resources.

10. A method for communicating over a network by a device having a plurality of device resources, comprising:
opening, on behalf of one of said device resources, a communication channel on said network;
using said communication channel, by said one of said device resources, to communicate with a remote device over said network;
once said using by said one of said device resources has ceased, only the device delaying a closing of said communication channel; and
once said delaying has commenced, selectively permitting another one of said device resources to use said communication channel;
wherein said delaying comprises:
closing said communication channel upon an elapsing of a predetermined duration, wherein said predetermined duration is a function of usage data collected on said plurality of device resources;
maintaining said communication channel in an open state while another one of said device resources is using said communication channel; and
after said maintaining, resetting said predetermined duration.

11. The method of claim 10, wherein said predetermined duration is a function of the device resource last communicating over said communication channel.

12. The method of claim 10, wherein said network is a wireless network, and said device is a wireless device.

13. The method of claim 12, wherein said wireless network is a cellular telecommunication network, said device is a cellular device.

14. The method of claim 10, wherein said device resource usage data is stored on the device.

15. The method of claim 10, wherein said device resource usage data is stored on another device over said network.

16. A device, comprising:
a bus;
a processor, coupled to said bus;
a communications interface, coupled to a network and to said bus; and
a plurality of device resources, coupled to said bus;
wherein
said processor is configured to cause said communications interface to open a communications channel on said network on behalf of a first one of said device resources for the first one of said device resources to utilize to communicate to other devices,
said processor is configured to delay closing of said communications channel until an expiration of a duration once a usage of said communications channel by said first one of said device resources has ceased, said duration being a predetermined time, wherein the predetermined time is set upon usage data collected on said plurality of device resources, and
said processor is configured to permit another one of said plurality of device resources to use said communications channel once the usage of the communications channel has ceased and before said expiration,
wherein said communications channel is maintained in an open state while said another one of said plurality of device resources is using said communications channel and said duration is reset once a usage of said communications channel by said another one of said plurality of device resources has ceased, and
wherein only said device is configured to delay closing of said communications channel.

17. The device of claim 16, wherein the predetermined time is a function of the device resource last communicating over said communications channel.

18. The device of claim 16, wherein the device selectively communicates with one or more servers across the network.

19. The device of claim 16, wherein the communications interface is a wireless network interface for communicating over a wireless network.

20. The device of claim 19, wherein the wireless network is a cellular network.

21. The device of claim 16, wherein the device resource usage data is stored on the device.

22. The device of claim 16, wherein the predetermined time is set via an external command.

23. A computer readable storage medium comprising instructions, which, when executed by a computer, cause the computer to perform operations, the instructions comprising:
at least one instruction for selectively opening a communication channel from a device to a network on behalf of a first device resource of a plurality of device resources of the device for the first device resource to utilize to communicate with one or more other devices across the network;
at least one instruction for delaying a closing of the communication channel until an expiration of a duration after the first device resource has ceased usage of the communication channel, only the device delaying the closing of the communication channel, the duration being a predetermined duration, wherein the predetermined duration is a function of usage data collected on said plurality of device resources;

at least one instruction for selectively allowing another one of said plurality of device resources to utilize the open communication channel once the delaying the closing of the communication channel has commenced and prior to closure thereof;

at least one instruction for maintaining said communication channel in an open state while said another one of said plurality of device resources is utilizing said communication channel; and at least one instruction for resetting said duration after said another one of said plurality of device resources has ceased to use said communication channel.

24. The computer readable storage medium of claim 23, wherein the duration is based upon the device resource last communicating across the open channel.

* * * * *